US00RE34574E

United States Patent [19]

Imoehl

[11] E Patent Number: Re. 34,574

[45] Reissued Date of Patent: Apr. 5, 1994

[54] ACCELERATOR CONTROL APPARATUS

[75] Inventor: William J. Imoehl, Williamsburg, Va.

[73] Assignee: Siemens Automotive L.P., Auburn Hills, Mich.

[21] Appl. No.: 758,983

[22] Filed: Sep. 10, 1991

Related U.S. Patent Documents

Reissue of:

[64] Patent No.: 4,869,220
Issued: Sep. 26, 1989
Appl. No.: 157,766
Filed: Feb. 18, 1988

[51] Int. Cl.[5] ..... F22B 37/50

[52] U.S. Cl. ..... 123/399; 74/513

[58] Field of Search ..... 123/361, 399; 74/513, 74/514; 338/153

[56] References Cited

U.S. PATENT DOCUMENTS

| | | | |
|---|---|---|---|
| 2,192,714 | 3/1940 | Norman et al. | 338/153 |
| 2,916,946 | 12/1959 | Harrison | 74/513 |
| 3,040,596 | 6/1962 | Du Shane et al. | 74/482 |
| 3,665,231 | 5/1972 | Wendler | 310/77 |
| 3,732,447 | 5/1973 | Perhats | 310/77 |
| 3,987,687 | 10/1976 | Bland et al. | 74/531 |
| 4,246,803 | 1/1981 | Klis et al. | 74/513 |
| 4,297,550 | 10/1981 | Leighton | 74/512 |
| 4,355,293 | 10/1982 | Driscoll | 338/184 |
| 4,428,349 | 1/1984 | Snow | 123/399 |
| 4,528,590 | 7/1985 | Bisacquino et al. | 74/513 |
| 4,590,385 | 5/1986 | Hamano et al. | 74/513 |
| 4,601,271 | 7/1986 | Ejiri et al. | 124/399 |
| 4,779,592 | 10/1988 | Takeuchi et al. | 123/399 |
| 4,850,319 | 7/1989 | Imoehl | 123/399 |
| 4,850,322 | 7/1989 | Uthoff et al. | 123/399 |
| 4,869,220 | 9/1989 | Imoehl | 123/361 |

FOREIGN PATENT DOCUMENTS

| | | | |
|---|---|---|---|
| 2221596 | 11/1973 | Fed. Rep. of Germany . | |
| 2368080 | 10/1977 | France . | |
| 2356007 | 2/1978 | France | 123/399 |
| 60-99729 | 6/1985 | Japan . | |
| 8300534 | 2/1983 | PCT Int'l Appl. . | |
| 8907706 | 8/1989 | PCT Int'l Appl. . | |

*Primary Examiner*—Noah P. Kamen
*Attorney, Agent, or Firm*—George L. Boller; Russel C. Wells

[57] ABSTRACT

An accelerator control apparatus for mounting in a motor vehicle for a "drive-by-wire" system. The apparatus provides a bias spring means to generate the "feel" of an accelerator pedal to the vehicle operator, a compression spring means provides frictional forces preventing extraneous pedal actuation and pedal sensor switch means for indicating the rotation position of the accelerator pedal from a first or normal position to any second position.

18 Claims, 2 Drawing Sheets

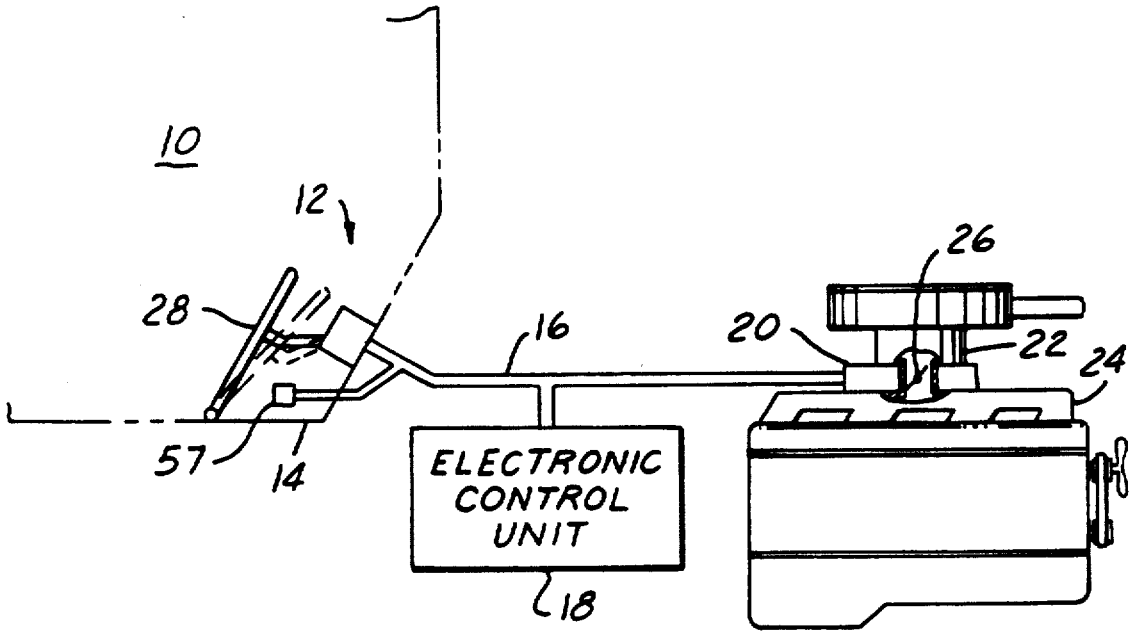
FIG. 1
FIG. 2
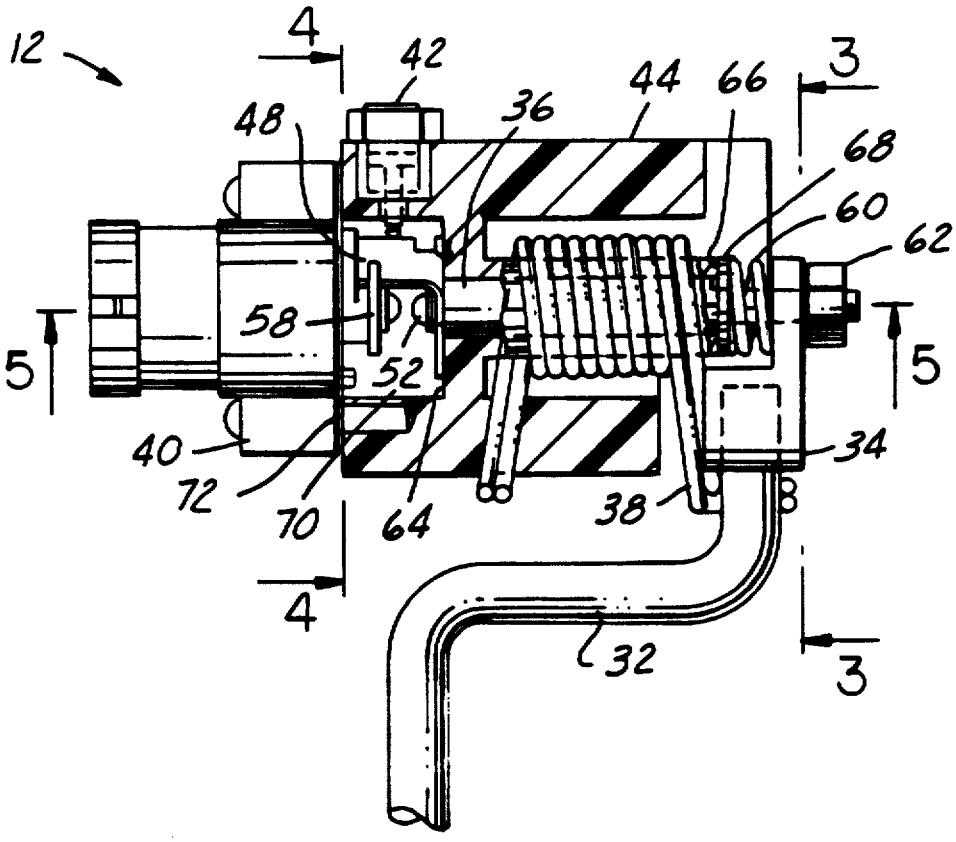

ACCELERATOR CONTROL APPARATUS

Matter enclosed in heavy brackets [ ] appears in the original patent but forms no part of this reissue specification; matter printed in italics indicates the additions made by reissue.

This invention relates to an accelerator control apparatus for motor vehicles in general and more particularly for an accelerator control apparatus for an electronic drive control system for a motor vehicle having an internal combustion engine.

BACKGROUND OF INVENTION

Conventional control of an accelerator in an internal combustion engine involves a series of links and linkages from a foot pedal in the passenger compartment of a motor vehicle to the butterfly valve or throttle blade in the air intake of the engine. To provide "feel" to the pedal and to return the throttle blade to idle, one or more heavy springs are positioned in the control chain of the accelerator to the throttle blade. Each link, spring and pivot position provides a source for misadjustment and failure. Failure because of corrosion and dirt between the pivot surfaces and the coils of the springs and misadjustment because of wear and looseness in the connection of the links.

SUMMARY OF THE INVENTION

Drive-by-wire or electronic throttle control is a concept where the motion of the foot pedal or accelerator control in the operator compartment of the vehicle is transferred by electrical signals to an actuator for moving the butterfly valve. The actuator in most instances is a d.c. motor which rotates the throttle blade from a substantially closed throttle position to a wide open throttle position. Positioning is determined in a servo controlled manner.

The communication between the accelerator control and the actuator in electronic throttle control is by means of signal wires and not heavy control links and linkages. The accelerator control is an apparatus which is mounted in the passenger compartment and to an operator it must have the "feel" and "operation" of a conventional accelerator apparatus in a non-electronic throttle controlled vehicle.

It is a principal advantage of the accelerator control apparatus of the present embodiment to transfer the rotation of the accelerator by means of electrical signals to the actuator on the throttle body of the internal combustion engine.

It is a further advantage of the accelerator control apparatus of the present embodiment to provide an apparatus that has the "feel" and "operation" of a conventional accelerator apparatus.

It is yet another advantage of the accelerator control apparatus of the present embodiment to provide an enclosed control apparatus shielded from external dirt and other means causing malfunction of the various elements of the apparatus.

These and other advantages will become apparent from the accelerator control apparatus for an electronic drive control system for an internal combustion engine having housing for an accelerator pedal control means. A shaft means is journalled in the housing and is coupled through a coupling means to the accelerator means. At least one bias spring means is mounted on the shaft means with one end of the spring means coupled to the accelerator pedal control means and the other end of the bias spring means secured to the housing to bias the accelerator pedal control means in a first position or home position.

A pedal sensor switch means responsive to the accelerator pedal for generating a first electrical signal indicative of the pedal in its first position and operable to operate a third electrical signal when the pedal is in any second position.

A position sensor means is positioned in the housing and is operable to generate a second electrical signal to indicate when the position of the accelerator pedal control means rotates from its first position to any other of a number of second positions. As used herein, any position other than a first position is a second position. The sensor means generates an electrical signal which is transmitted to the actuator on the throttle body.

In the overall system, the electronic control can sense the position of both the position sensor and the pedal sensor and provide one of many checks to determine operation of the accelerator control apparatus.

Many other objects and purposes of the invention will be clear from the following detailed description of the drawings.

BRIEF DESCRIPTION OF THE DRAWINGS

In the drawings:

FIG. 1 is a block diagrammatic schematic of an electronic throttle control system illustrating the relationship of the accelerator control apparatus with the other elements of the system.

FIG. 2 is a plan view of the accelerator control apparatus with parts broken away for clarity.

DESCRIPTION OF THE PREFERRED EMBODIMENT

Figure 3:
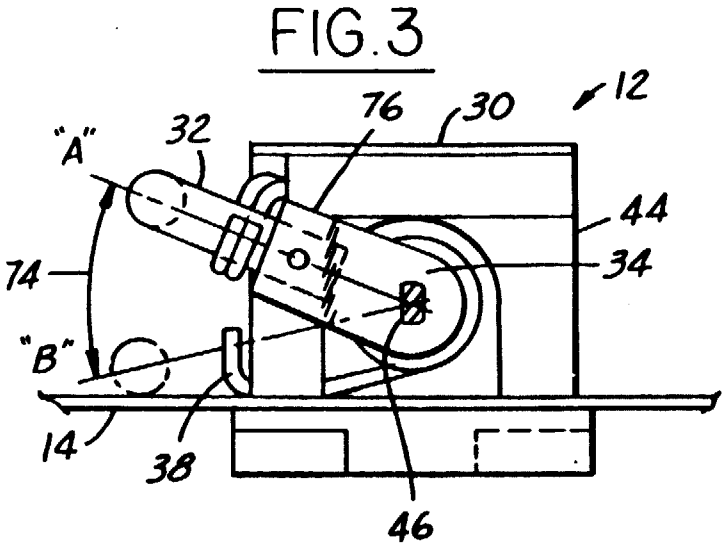
FIG. 3 is one end view of the accelerator control apparatus taken along line 3—3 in FIG. 2.

FIG. 1 is schematic block diagram of a portion of a motor vehicle illustrating the relationship among the several elements of an electronic throttle control system. In the occupant compartment 10 there is the accelerator control apparatus 12 of the present invention. This is illustrated mounted to the floor 14 of the occupant compartment 10. An electric wire cable 16 connects the accelerator control apparatus 12 to an electronic control unit or ECU 18 which contains the electronic logic for operating the electronic throttle control system. This ECU 18 may be a dedicated ECU in that it only controls the throttle or it may be a part of a large engine or vehicle control system ECU.

The cable 16 also connects both the ECU 18 and the accelerator control apparatus 12 to the throttle actuator 20 mounted on the throttle body 22 on the engine 24 for controlling the rotation of the throttle blade 26. The electronic throttle system is also called a "drive-by-wire" system since the connection between the driver and the throttle blade 26 is by means of electric wires or cable 16 and not rigid linkages.

As illustrated in FIG. 1, the accelerator pedal 28, as it is rotated by the engine operator, moves between two extreme positions. The first position "A", which is one extreme position, is the normal position or at rest position which is when the vehicle engine is idling and operator is not actuating the accelerator 28. The other extreme position "B", which is just one of many second positions, is in the preferred embodiment defined by the accelerator pedal 28 bottoming on the floor 14 of the vehicle. Of course, this position can be limited by other means which do not require the accelerator pedal 28 to reach the floor. As used herein, any position other than the first position is a second position.

FIG. 2 is a plan view of the accelerator control apparatus housing 44 with the top cover 30 removed to show the relationship of the several elements of apparatus 12. There is illustrated the accelerator pedal control means 32, more particularly the arm from the pedal 28 to the apparatus 12, the coupling means 34, a shaft means 36, a bias spring means 38, a position sensor means 40 and a pedal sensor switch means 42. The arm from the pedal 28 is received in the pedal coupling means 34 and secured there by suitable fastening means such as brazing or pinning. As previously stated, the normal position of the accelerator control apparatus 12 is with the accelerator pedal control means [34] *32* not being actuated and the pedal coupling means in the upper position "A" as illustrated in solid lines in FIG. 3.

The coupling means 34, in the preferred embodiment, is secured to the shaft means 36 which is journalled in the housing 44. The coupling means 34 has a slot 46 with parallel sides matching the end profile of the shaft means 36 and it is through this slot that the coupling means 34 rotates the shaft means 36 in response to the pivoting of the pedal 28 by the operator.

Secured to the other end of the shaft means 36 is a sensor actuator means 48 which when rotated actuates both the position sensor means 40 and the pedal sensor switch means 42. The actuator means 48 is secured to the shaft means 36 for rotation therewith by means of a slot 50 with parallel sides which matches the end profile of the shaft means 36. Additionally, the actuator means 48 is prevented from coming off the shaft means by suitable fastening means 52.

Figure 4:
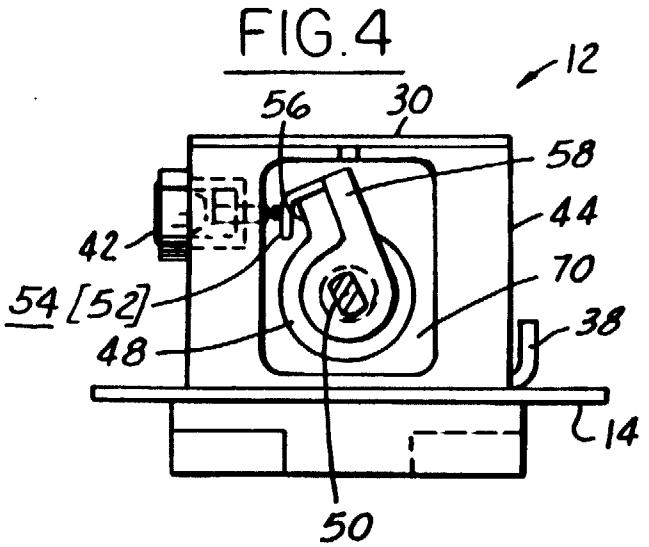
FIG. 4 is the other end view of the accelerator control apparatus taken along line 4—4 in FIG. 2 and illustrating the end of the shaft means.
Figure 5:
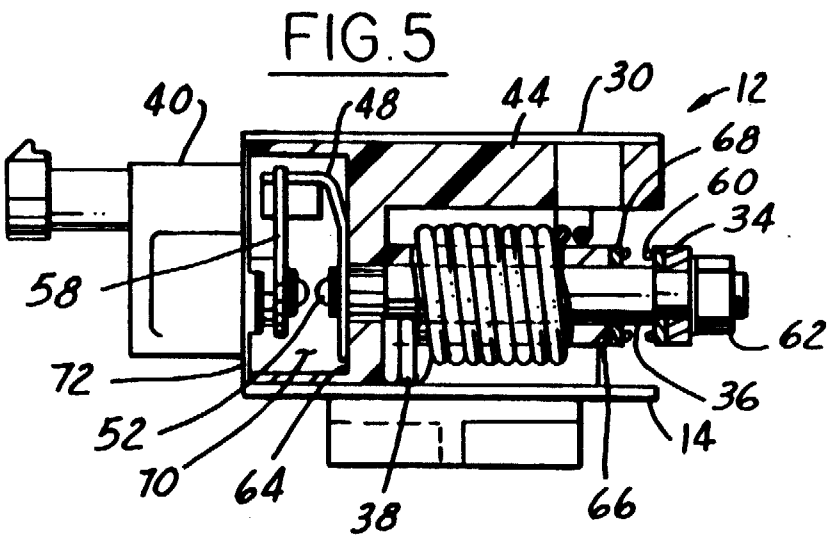
FIG. 5 is a sectional view taken along line 5—5 in FIG. 2.

The actuator means 48, in the preferred embodiment has two actuation surfaces as illustrated in FIG. 4. The first actuation surface 54 is a paddle-like surface which operates to depress the actuator of the pedal sensor switch means 42. The second actuation surface 56 is another paddle-like surface which bears against a lever 58 for operating the position sensor means 40.

The pedal sensor switch means 42 in the preferred embodiment is a normally closed switch that is open when the actuator means 48 is in its normal position and generates a first electrical signal and as soon as the actuator means 48 is rotated by the shaft means 36, the first actuation surface 54 moves away from the switch actuator causing the switch contacts to close generating a third electrical signal.

An alternative to the normally closed switch is a pedal pressure sensor means 57 which is actuated by "foot-on" pressure being applied to the accelerator pedal 28. In the alternative, this sensor could respond to the rotation of the coupling means 34 or shaft means 36.

The position sensor means 40 in the preferred embodiment is a rotary switch wherein its angular displacement is adaptable to generate a second electrical signal indicative of such displacement. In the preferred embodiment, such a position sensor means 40 may be that described in U.S. Pat. No. 4,355,293 issued on October 19, 1982 to Barry J. Driscoll and entitled "Electrical Resistance Apparatus Having Integral Shorting Protection" which is assigned to a common assignee and is incorporated herein by reference.

The position sensor means 40 is essentially a variable resistance and as the lever 58 is rotated, wipers inside the sensor means 40 move across a resistance. There are three wire leads to the sensor, one lead is generally a voltage power lead and is connected to one end of the variable resistance, a second lead is connected to the wipers and a third lead is connected to the other end of the variable resistance and is generally a ground lead. As the lever 58 is rotated, the lead connected to the wipers has an output voltage signal relative to the position of the wipers on the variable resistance.

As illustrated in the FIGURES, there is a bias spring means 38 which is a torsion spring having one end secured to the housing 44 and a second end coupled to the accelerator pedal control means 32. The coils of the bias spring means 38 surround the shaft means 36 but do not inhibit its rotation. The function of the bias spring means 38 is to bias the accelerator pedal control means 32 in its normal position "A". As the accelerator pedal control means 32 is rotated, the bias spring means 38 applies an opposite rotational force to the accelerator pedal control means 32 giving the requisite "feel" to the vehicle operator. When the accelerator pedal 28 is released, the bias spring means 38 operates to return the accelerator pedal 28 to its normal position. For redundancy, the bias spring means 38 may have more than one spring, with each having sufficient torsional force to return the accelerator pedal 28 to its normal position.

Another element of the acceleration control apparatus 12 which affects "feel" is friction. To mimic the "feel" of a rigid linkage actuatated system and to aid the driver in holding the accelerator pedal 28 in a given position even on the bumpiest roads a controlled amount of hysteresis or frictional force is provided in the apparatus 12. A second bias means or compression spring 60 is positioned over the shaft means 36 between the coupling means 34 and the housing 44. By a fastening means 62 or threaded member such as a nut, the ends of the shaft means 36 are drawn against the surfaces 64,66 of the housing 44 or an intermediate washer means 68. The more the spring 60 is compressed, the greater is the force normal to the surface of the housing 44 and washer means 68 the greater is the frictional force. In the preferred embodiment the housing 44 and/or the intermediate washer means 68 is fabricated from an aramid fiber composition, a "highly orientated polyethylene", or a long glass fiber nylon. This material gives a non-abrasive wear resistance to the normal forces applied by the compression spring 60 and operates to extend the operational life of the accelerator control apparatus 12.

The housing 44, in the preferred embodiment, is fabricated in such a manner to place the several groupings of elements in substantially enclosed pockets or volumes in order to keep dirt and other foreign articles from interferring. In particular each end of the shaft means 36 may terminate in one such enclosed pocket 70 which is formed by the housing 44 and one or more outside covers 72.

Figure 6:
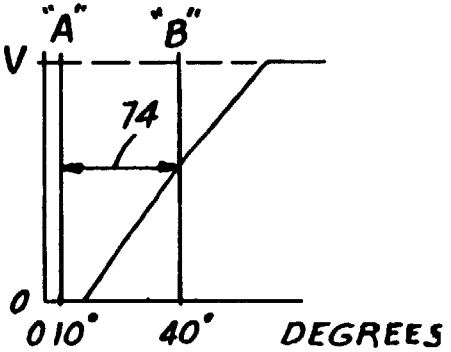
FIG. 6 is a graphic representation of the relationship of the angular movement of the accelerator pedal and the response of the position sensor.

FIG. 6 is a graphic representation of the adjustment of the accelerator control apparatus 12 and the [the] position sensor means 40. The actuator means 48 is so positioned so that in its normal position "A", the output of the position sensor means 40 is at one of the voltage extremes; shown here as ground. In actual practice the total arc 74 of rotation of the accelerator pedal control means 32 is approximately forty degrees and as illustrated on the graph this range is from the normal position "A" to part way up the slope of the position sensor means 40 output. This feature is needed for repeatability and also makes the assembly of the apparatus 12 much simpler and hence not as expensive.

Another feature provided in the design of the housing 44 is a built-in stop 76 defining the normal position "A". The stop 76 bears against the coupling means 34 in the normal position. As previously mentioned the extreme second position "B" may be limited by the pedal 28 against the floor 14 of the vehicle or in the alternative, the housing may also have a second built-in stop surface, not shown, to control the rotational movement of the accelerator pedal control means 28 or the coupling means 34.

The pedal sensor switch means 42, being a normally closed switch, can be used to check the position of the accelerator pedal 28. The output of the switch can be compared with the position sensor means 40 and the integrity of the apparatus 12 may be determined. For instance if the pedal sensor switch means 42 is open and the position sensor means 40 is generating an output voltage that is not the normal position voltage, this is an indication of a mismatch in the system and the ECU will determine the action to take. Conversely, if the pedal sensor switch means 42 fails and is in a closed position when the position sensor means 40 is in the normal position "A", this is an indication of a mismatch.

Another mismatch indication is when the output of the position sensor means 40 is at the opposite extreme voltage from the normal position voltage level. This might indicate a shorted position sensor means 40. Still another mismatch that can be detected by comparing the outputs of the position sensor means 40 and the pedal sensor switch means 42 is that with a normally closed switch, a broken wire can be distinguished from a "foot-on" condition on the accelerator pedal 28.

There has thus been described an accelerator control apparatus 12 for an electronic drive control system for an internal combustion engine 24 having an enclosed housing 44 for an accelerator pedal control means 32. The accelerator pedal control means 32 provides the "feel" to the vehicle operator necessary for successful vehicle operation and provides diagnostic capability to determine the integrity of the apparatus 12. In the overall system, an electronic control can sense the position of both the position sensor means 40 and the pedal sensor switch means 42 and provide one of many checks to determine operation of the accelerator control apparatus 12.

Many changes and modifications in the above described embodiment of the invention can, of course, be carried out without departing from the scope thereof. Accordingly, that scope is intended to be limited only by the scope of the appended claims.

I claim:

1. An accelerator control apparatus for an electronic drive control system for an internal combustion engine, said apparatus comprising:

pedal means adapted to be rotated from a first position to another position;

shaft means;

bias spring means normally biasing said pedal means in said first position;

position sensor means rotatively coupled to said shaft means for generating a first electrical signal indicative of the angle of rotation thereof;

pressure switch means coupled to said pedal means and responsive to pressure applied to pivot said pedal means for generating a second electrical signal indicative of said pedal means in said first position; and friction means at the end of said shaft means, providing friction forces to said shaft means for damping the rotation of said shaft means.

2. An accelerator control apparatus for an electronic drive control system for an internal combustion engine, said apparatus comprising:

a housing;

accelerator pedal control means;

shaft means journalled in said housing;

coupling means for coupling said accelerator pedal control means to said shaft means *such that operation of said accelerator pedal control means rotates said shaft means;* bias spring means operable to bias said accelerator pedal control means in a first position, one end of said bias spring means coupled to said accelerator pedal control means and the other end of said bias spring means secured to said housing;

pedal sensor switch means responsive to said accelerator pedal control means in said first position for generating a first electrical signal indicative of said pedal control means in said first position; and position sensor means operable to generate a second electrical signal to indicate a second position of said accelerator pedal control means as said accelerator pedal control means rotates from said first position to said second position, and a friction-creating mechanism that is active on said shaft means for damping rotation of said shaft means;

*said friction mechanism comprising a member that rotates with said shaft means and has a planar surface that both faces axially of said shaft means and faces a planar surface of said apparatus that does not rotate with said shaft means, and resilient means for imparting to said member in a direction axial of said shaft means a force that urges said surfaces together, one of said surfaces being a friction surface, thereby developing a desired damping characteristic.*

[3. An accelerator control apparatus connected to an accelerator pedal for an internal combustion engine, said apparatus comprising:

a housing;

coupling means coupled to said housing and the accelerator pedal and mounted for rotation from a first position to one of a plurality of second positions;

shaft means journalled in said housing and adapted to be rotated by said coupling means;

bias spring means coupled to said shaft means and operable to bias said coupling means in said first position;

sensor means responsive to said coupling means in said first position for generating a first electrical signal and when said coupling means is in said second position for generating a third electrical signal; and means responsive to the rotation of said shaft means in response to said coupling means for generating a second electrical signal indicating the amount of rotation from said first position to said second position.]

[4. An accelerator control apparatus for an internal combustion engine according to claim 3 additionally including a second bias means for preloading said shaft means against rotation.]

*5. An accelerator control apparatus connected to an accelerator pedal for an internal combustion engine, said apparatus comprising:*

*a housing;*

*coupling means coupled to said housing and the accelerator pedal and mounted for rotation from a first position to one of a plurality of second positions;*

*shaft means journaled in said housing and adapted to be rotated by said coupling means;*

*bias spring means coupled to said shaft means and operable to bias said coupling means in said first position;*

*sensor means responsive to said coupling means in said first position for generating a first electrical signal and when said coupling means is in said second position for generating a third electrical signal; and*

*means responsive to the rotation of said shaft means in response to said coupling means for generating a second electrical signal indicating the amount of rotation from said first position to said second position;*

*including a second bias means for preloading said shaft means against rotation; and*

[An accelerator control apparatus for an internal combustion engine according to claim 4 wherein]

said second bias means includes friction washer means around said shaft means and bearing against said housing, and a compression spring around said shaft means and bearing against said friction washer means and said coupling means.

*6. An accelerator control apparatus connected to an accelerator pedal for an internal combustion engine, said apparatus comprising:*

*a housing;*

*coupling means coupled to said housing and the accelerator pedal and mounted for rotation from a first position to one of a plurality of second positions;*

*shaft means journaled in said housing and adapted to be rotated by said coupling means;*

*bias spring means coupled to said shaft means and operable to bias said coupling means in said first position;*

*sensor means responsive to said coupling means in said first position for generating a first electrical signal and when said coupling means is in said second position for generating a third electrical signal; and*

*means responsive to the rotation of said shaft means in response to said coupling means for generating a second electrical signal indicating the amount of rotation from said first position to said second position; and*

[An accelerator control apparatus for an internal combustion engine according to claim 3] wherein sensor means responsive to said coupling means in said first position for generating a first electrical signal and when said coupling means is in said second position for generating a third electrical signal, is a pressure sensor responsive to the pressure on said coupling means rotating said coupling means from said first position for generating said third electrical signal.

[7. An accelerator control apparatus for an internal combustion engine according to claim 3 wherein said sensor means responsive to said coupling means in said first position for generating a first electrical signal and when said coupling means is in said second position for generating a third electrical signal, is a switch actuated by a sensor actuating means rotating from said first position for generating said third electrical signal.]

[8. An accelerator control apparatus for an internal combustion engine according to claim 7 wherein said switch means is a normally closed switch actuated by said sensor actuating means in said first position and normalized by said coupling means in said second position.]

*9. In an accelerator pedal control apparatus that remotely controls a motor that powers an automotive vehicle via electrical signals wherein the apparatus comprises a housing mounted on the vehicle, a shaft journaled on the housing for rotary motion, a foot pedal for imparting rotary motion to the shaft, at least one spring causing the shaft to be rotary biased toward a first position corresponding to the absence of foot actuation of the pedal, and an electrical sensor that is operated by the rotary motion of the shaft to positions away from said first position to signal the amount of rotary motion imparted to the shaft away from said first position by the pedal, the improvement which comprises a friction mechanism that acts on the shaft to dampen rotary motion of the shaft, said friction mechanism including a member that rotates with said shaft and has a planar surface that both faces axially of said shaft and also faces a planar surface of said apparatus that does not rotate with said shaft, and resilient means for imparting to said member in a direction axial of said shaft a force that urges said surfaces together, one of said surfaces being a friction surface, thereby developing a desired damping characteristic.*

*10. The improvement set forth in claim 9 in which said resilient means comprises a coil spring that is disposed coaxial with said shaft.*

*11. The improvement set forth in claim 10 in which said coil spring is disposed to surround said shaft.*

*12. The improvement set forth in claim 9 in which said member comprises a washer that is disposed coaxially around said shaft and between said resilient means and said surface that does not rotate with said shaft.*

*13. The improvement set forth in claim 9 in which said at least one spring is a coiled torsion spring disposed to coaxially surround said shaft.*

*14. The improvement set forth in claim 9 further including a switch that is disposed on said housing and is effective to distinguish between said shaft occupying said first position and said shaft occupying positions away from said first position.*

*15. An accelerator pedal control apparatus adapted for installation and use in an automotive vehicle in association with a foot pedal to provide remote control of a motor that powers the vehicle via electrical signals wherein the apparatus comprises a housing adapted to be mounted on the vehicle, a shaft that is journaled on the housing for rotary motion and that is adapted to execute rotary motion in response to the operation of such a pedal, at least one spring causing the shaft to be rotary biased toward a first position corresponding to the absence of foot actuation of such a pedal, and an electrical sensor that is disposed on the housing and is operated by the rotary motion of said shaft to positions away from said first position to signal the amount of rotary motion imparted to the shaft away from said first position against said at least one spring, characterized in that a friction mechanism is disposed on the housing to act on the shaft to dampen rotary motion of the shaft, and said friction mechanism includes a member that rotates with*

*said shaft and has a planar surface that both faces axially of said shaft and also faces a planar surface of said apparatus that does not rotate with said shaft, and resilient means for imparting to said member in a direction axial of said shaft a force that urges said surfaces together, one of said surfaces being a friction surface, thereby developing a desired damping characteristic.*

*16. Accelerator pedal control apparatus as set forth in claim 15 characterized further in that said at least one spring comprises at least one coiled torsion spring that is disposed to coaxially surround said shaft.*

*17. Accelerator pedal control apparatus as set forth in claim 16 characterized further in that said at least one coiled torsion spring is disposed to also coaxially surround a portion of said housing through which said shaft passes.*

*18. Accelerator pedal control apparatus as set forth in claim 15 characterized further in that said member comprises a washer that is disposed coaxially around said shaft and between said resilient means and said surface that does not rotate with said shaft.*

*19. Accelerator pedal control apparatus as set forth in claim 15 characterized further in that said resilient means comprises a coil spring that is disposed coaxial with said shaft.*

*20. Accelerator pedal control apparatus as set forth in claim 19 characterized further in that said coil spring is disposed to surround said shaft.*

*21. Accelerator pedal control apparatus as set forth in claim 20 characterized further in that said member comprises a washer that is disposed coaxially around said shaft and between said coil spring and said surface that does not rotate with said shaft.*

*22. Accelerator pedal control apparatus as set forth in claim 15 characterized further by the inclusion of a switch that is disposed on said housing and is effective to distinguish between said shaft occupying said first position and said shaft occupying positions away from said first position.*

* * * * *